US006677887B2

(12) United States Patent
Harman

(10) Patent No.: US 6,677,887 B2
(45) Date of Patent: Jan. 13, 2004

(54) INTRUSION DETECTION RADAR SYSTEM

(75) Inventor: Robert Keith Harman, Tempe, AZ (US)

(73) Assignee: Southwest Microwave, Inc., Tempe, AZ (US)

( * ) Notice: Subject to any disclaimer, the term of this patent is extended or adjusted under 35 U.S.C. 154(b) by 0 days.

(21) Appl. No.: 09/971,930

(22) Filed: Oct. 4, 2001

(65) Prior Publication Data

US 2002/0060639 A1 May 23, 2002

Related U.S. Application Data

(60) Provisional application No. 60/240,468, filed on Oct. 11, 2000.

(51) Int. Cl.[7] .............................................. G01S 13/62
(52) U.S. Cl. ..................... 342/28; 342/99; 342/107; 342/109; 342/113; 342/114; 342/115
(58) Field of Search ........................... 342/28, 99, 100, 342/101, 104, 106, 107, 109, 113, 114, 115, 192, 196; 340/541, 554, 567

(56) References Cited

U.S. PATENT DOCUMENTS

| 3,832,709 A | * | 8/1974 | Klein et al. ................. 342/127 |
| 4,054,871 A | * | 10/1977 | Terrell et al. ................ 342/28 |
| 4,286,260 A | * | 8/1981 | Gershberg et al. .......... 340/554 |
| 4,319,349 A | * | 3/1982 | Hackett ....................... 367/94 |
| 6,380,882 B1 | * | 4/2002 | Hegnauer ..................... 342/28 |
| 2002/0060639 A1 | * | 5/2002 | Harman ....................... 342/28 |

OTHER PUBLICATIONS

"New microwave sensors for intrusion detection systems", Martinez, F.P.; Galeano, F.C.; Security Technology, 1999. Proceedings. IEEE 33rd Annual 1999 International Carnahan Conference on , Oct. 5–7, 1999 Page(s): 49–53.*

* cited by examiner

Primary Examiner—John B. Sotomayor
(74) Attorney, Agent, or Firm—Joseph H. Roediger; Gregory J. Nelson

(57) ABSTRACT

An outdoor microwave transceiver intrusion detector that alternately transmits pulses of RF energy at two different frequencies and uses range and direction of travel information derived from the phase of the two Doppler responses to optimize the signal processing and apply range dependent thresholds. The time delay between the onset of the transmitted pulse and the sample of the Doppler response is controlled to provide an accurate range cutoff. The two frequencies are selected so that the difference in phase of the Doppler response at the two frequencies increases from zero to ninety degrees as the target goes from the Transceiver to the maximum range. Digital signal processing is used to measure the difference in phase of the two Doppler responses and translate this information into location of the target. The location information is used to create a number of range bins. The response integration time and the threshold level are optimized for each of the range bins thereby minimizing the number of nuisance alarms.

15 Claims, 4 Drawing Sheets

INTRUSION DETECTION RADAR SYSTEM

CROSS REFERENCE TO RELATED APPLICATION

The present application is based on provisional patent application Serial No. 60/240,468 filed on Oct. 11, 2000.

BACKGROUND OF THE INVENTION

This invention relates to outdoor intrusion detection using microwave transmissions, and more particularly to a Doppler Radar sensor using two frequencies to derive range information, which is used to optimize the detection process to discriminate against nuisance alarms and detect human intruders.

The detection of human intruders as they cross outdoor perimeters plays a significant role in the prevention of crime. Intrusion detection sensors based on Doppler Radar are in common use today. For example, the assignee produces a number of products based on U.S. Pat. No. 4,697,184 that are used at high security sites around the world.

The major challenge in developing a Doppler Radar for intrusion detection is to detect human targets at ranges up to 400 feet while not detecting very small moving objects such as rain drops near the radar antenna or on the antenna radome. The fact that the power reflected from a moving target decreases as the fourth power of the range to the target makes the reflection from very small objects in proximity to the radar comparable to much larger targets at a long range. There are a number of patents relating to means to cope with this very challenging design problem.

It has been recognized for some time that a Doppler Radar using two frequencies can be used to locate and determine the direction of a moving target. U.S. Pat. No. 3,766,554 issued Oct. 16, 1973 describes a two frequency CW Doppler radar using the phase relationship between the two Doppler responses to create a range cutoff. U.S. Pat. No. 3,832,709 issued Aug. 27, 1974 describes a Doppler radar that alternately transmits on two frequencies and uses circuitry to recreate the two Doppler Responses. In these patents the phase relationship between the two Doppler responses is used to locate the target.

U.S. Pat. No. 4,697,184 issued Feb. 9, 1984 and assigned to the present assignee describes a two frequency Doppler Radar for the detection of intruders. The two frequencies are transmitted alternately and circuitry is used to take a narrow sample of the received Doppler response signal corresponding to each frequency at a fixed time delay from the onset of the transmitted pulse. This timing circuit provides an adjustable well-defined range cutoff while preserving the relatively narrow bandwidth required to meet FFC regulations. The two frequencies are selected so that the Doppler responses are in-phase for targets at the transceiver and are in quadrature-phase at the maximum range. The peak difference between the two Doppler responses is compared to a threshold to detect the presence of an intruder. By adjusting the relative gain of the two Doppler channels, a null is created for targets in proximity to the radome of the transceiver. This minimizes the number of nuisance alarms caused by raindrops on the radome. The installer defined range cutoff and suppression of responses due to raindrops on the radome has proven to be very beneficial to users of these sensors. Despite these benefits there is an ongoing drive to further reduce the number nuisance alarms.

In the sensor based on U.S. Pat. No. 4,697,184 the difference in amplitude of the two Doppler responses is used as the measure of the target amplitude. It can be shown that this provides gain compensation, which follows a sine wave from zero to ninety degrees. The zero is at the radome and the ninety degrees is at the maximum range. While the amplitude of this compensation is the same for the quadrature-phase compensation used in the present invention, it does not provide information as to the axial direction of the target motion or range of the target as does the present invention. The ability to tell target direction provides discrimination against periodic target motion such as due to blowing grass or shrubs that is not possible if one uses only the difference between the Doppler responses.

The objective of the present invention is to use digital signal processing to improve upon the performance of the Doppler Radar described in U.S. Pat. No. 4,697,184. The sensor described in this patent is limited by having only one threshold and one integration time constant to process the very wide range in amplitude response. Specifically, the improvements herein relate to further reducing the nuisance and false alarms rate by using the Doppler phase information to determine the range to the target and optimal response integration and threshold level as a function of range.

BRIEF SUMMARY OF INVENTION

The present invention provides microwave Doppler radar detection of intruders in an outdoor environment. A directional antenna is used to transmit pulses of RF energy and to receive signals reflected from targets moving in the detection zone defined by the electromagnetic field pattern of the antenna. The pulses of RF energy alternate in frequency between $fA$ and $fB$. An intruder moving in the detection zone creates a Doppler response at each of the two frequencies which when processed provides range and direction of travel information. This range information is used to optimize the signal integration and to apply a range dependent threshold to minimize the nuisance alarm rate.

The radar is designed to detect intruders moving in a detection zone from a minimum to a maximum range. The start of the detection zone is usually determined by the distance at which the antenna field has sufficient vertical beam width to detect a crawling intruder and an intruder attempting to jump over the detection field. The end of the detection zone is determined by the range cutoff setting. The installer defined range cutoff is used to avoid nuisance alarms from objects moving beyond the detection zone.

The time delay between the transmission of the pulse and the receipt of the pulse reflected from the target is directly proportional to the distance between the antenna and the target as determined by the velocity of free space. The transmitted pulse length is selected to be longer than the time delay relating to a target at the maximum range cutoff setting. This relatively long transmit pulse has a sufficiently narrow bandwidth to meet radio regulatory criteria.

A target moving in the detection zone reflects a small percentage of the transmitted pulse back to the receiver. This received signal is detected and a Doppler response is generated. This Doppler response is amplified in a logarithmic amplifier in order to compress the dynamic range of the Doppler response with distance from the transceiver. The number of cycles of Doppler response per unit distance traveled by the target along the axis of the antenna is directly proportional to frequency. Hence the phase difference between the Doppler response at $fA$ and $fB$ is proportional to the range of the target. The difference between $fA$ and $fB$ is selected so that the phase angle at the maximum range is ninety degrees. This means that the two Doppler responses are in-phase when the target is at the antenna and in-quadrature phase when the target is at the maximum range.

The Doppler response to each transmitted pulse is digitized during a very narrow sample window interval. The time delay between the onset of the transmit pulse and the sample window is determined by the range cutoff setting. Hence if the target response arrives after the sample window interval, it is not detected. This provides a very precise range cutoff.

The digital signal processing can be explained in terms of a Lissajous figure. If one were to apply $fA$ and $fB$ Doppler signals to the X and Y input to an oscilloscope, the Doppler signals would create an elliptical Lissajous figure. The ratio of the major and minor axis of the ellipse is a measure of the target range. The direction and speed with which the ellipse is traced are measures of the direction and velocity towards or away from the transceiver. When the target approaches the transceiver, the elliptical Lissajous figure approaches a line at 45 degrees in quadrants 1 and 3. At mid range, the elliptical Lissajous figure approaches a circle. As the target approaches the maximum range, the elliptical Lissajous figure approaches a line at 135 degrees in quadrants 2 and 4.

The two Doppler responses are digitized. Each pair of $fA$ and $fB$ samples represents a point in tracing out the Lissajous figure. Successive sample pairs effectively trace out the Lissajous figure. Digital signal processing is effectively used to measure the dimensions of the Lissajous figure, the number of sample pairs per revolution of the Lissajous figure and the direction that the Lissajous figure is traced.

The Root of the Mean of the Square (RMS) magnitude of the Doppler responses while in quadrants 1 and 3 is called "ZE", the amplitude of the "Even" response. The RMS of the Doppler response while in quadrants 2 and 4 is called "ZO", the amplitude of the "Odd" response. In the present invention the sum, ZO+ZE/4, is used as a measure of the amplitude of the target response. This was chosen to provide nearly linear response over the target range of interest with the logarithmic amplifier used.

There are two measures of target range. The ratio of ZE to ZO is a measure of the range of the target from the transceiver. Secondly, the ratio of the number of sample pairs in the even quadrants minus those in the odd quadrants is a measure of the range of the target from the transceiver. The first approach is used in proximity to the transceiver and the second method is used at the further ranges. This range information is used to generate a number of range bins.

The width of the detection zone is largely determined by the beam width of the antenna pattern. In general this means that the detection zone widens with range and an intruder crossing through the detection zone at a constant velocity will take longer to get through the detection zone at further ranges. This means that increasing the period of the integration of the target response for each range bin as the target range increases can optimize Signal to Noise Ratio (SNR) of the response.

The design of the antenna is a major factor in determining the shape of the detection zone. Often the radar is used to detect intruders between chain link fences around the perimeter of a high security site. In general one wants to keep the beam width as narrow as possible so as to minimize unwanted reflections from the fences as they move in the wind. However in elevation the wider the antenna pattern the better the detection of crawling intruders near the antenna. This has led to the design of a contoured dish reflector that optimizes these conflicting requirements.

Target velocity is an important factor in optimizing the detection routine. A running intruder crosses through the detection zone faster than a crawling target. On the other hand a running target presents a larger radar cross section and a larger target response. Having separate thresholds for a High Speed Channel and a Low Speed Channel for each to the range bins further reduces the nuisance alarm rate.

Further features and advantages of the invention will become more readily apparent from the following detailed description of a preferred embodiment of the invention when viewed in conjunction with the accompanying drawings.

DESCRIPTION OF INVENTION

Figure 1:
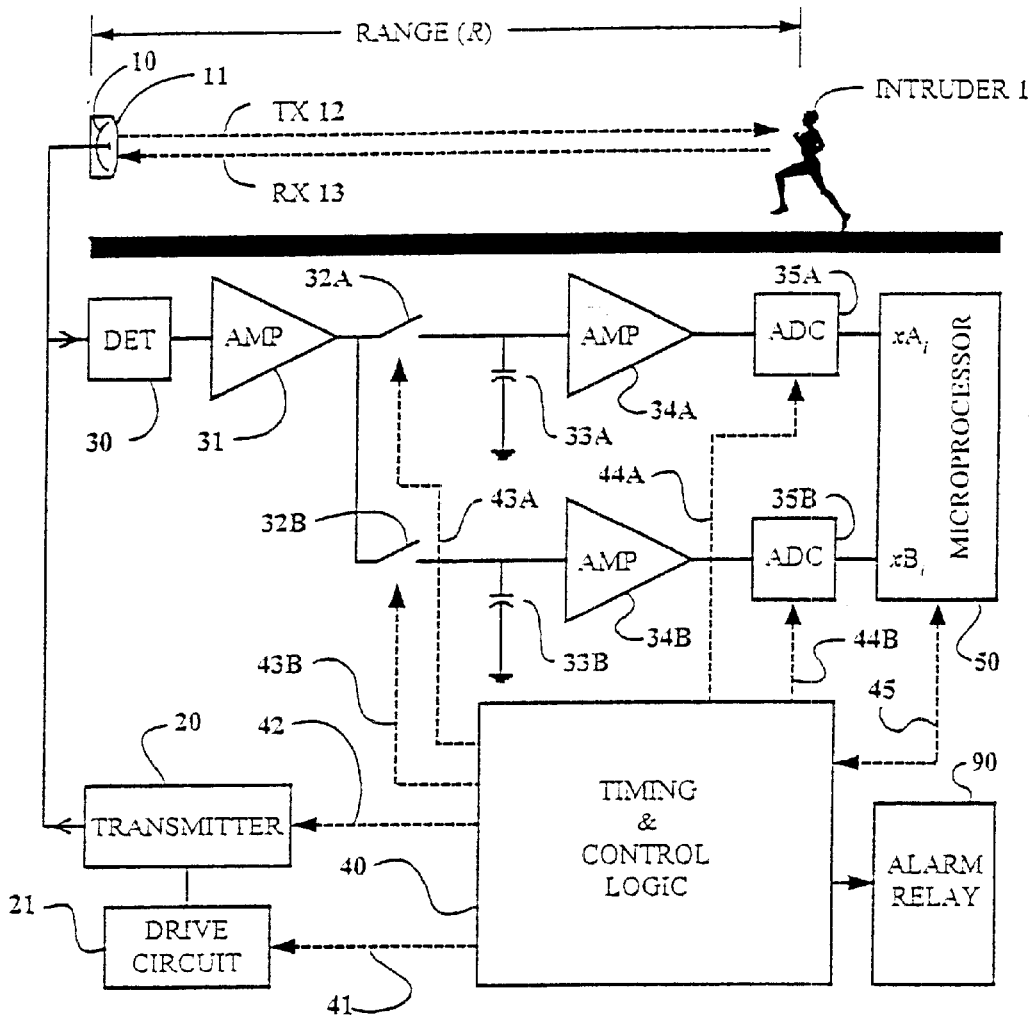
FIG. 1 is a block diagram of a preferred embodiment of the Doppler radar intrusion sensor of the present invention.

The basic operation of the Doppler intrusion sensor is illustrated in the upper portion of FIG. 1. A pulse of RF energy 12 is transmitted from antenna 10 and through radome 11. It propagates over the surface of the terrain to illuminate moving intruder 1. A small percentage of this RF pulse 13 is reflected back through radome 11 to antenna 10. It is this reflected signal that is used to detect the presence of the intruder.

Radome 11 is designed to protect the antenna from the elements while providing minimal RF attenuation. The radome is curved in such a way as to minimize the Doppler response due to rain droplets that form and roll down the surface of the radome. The distance from the antenna to the radome determines the minimum range to a water droplet.

The antenna field pattern associated with antenna 10 determines the shape of the detection zone. The horizontal beam width of the antenna creates a detection zone that increases approximately linearly with range. Hence assuming the intruder has a constant velocity radial to the antenna, the transit time increases with radial distance. While in theory the intruder could follow a constant radial path across the detection zone and not create a Doppler response, the wavelength is sufficiently small that this can not happen in practice. It is the radial velocity of the intruder that determines the frequency of the Doppler response.

The antenna field pattern, the proximity to the ground plane, the radar cross section of the intruder 1 and the directivity of the intruder as an antenna determine the percentage of the transmitter signal that is reflected back to the antenna 10. The radar cross section of the intruder 1 is significantly smaller for a crawling intruder than for an intruder walking or running through the detection zone.

The lower portion of FIG. 1 contains the block schematic diagram of the preferred embodiment wherein timing and logic circuitry 40 applies a voltage on line 42 to transmitter 20 to select either frequency $fA$ or frequency $fB$. It controls the timing of the pulse transmission over line 41 to the drive circuit 21 that turns on transmitter 21. In the preferred embodiment of the radar the pulse width is 1 microsecond long and frequencies $fA$ and $fB$ are in the K band of the RF spectrum. The 1 microsecond long pulse is longer than the 0.8 microsecond propagation delay to a target at the maximum range of 400 feet and back to the antenna.

The logic circuit 40 alternately transmits the 1 microsecond pulses at a 32 kHz rate. The amplitude of this 3.2% duty cycle transmission is controlled to meet FCC and world radio regulatory emission standards. The RF pulse reflected from any target moving within the detection zone is received back at the antenna within 1 microsecond of the transmitted pulse.

The signal received at antenna 1 is supplied to the detector 30 where the Doppler response is generated. The phase difference expressed in radians between the $fA$ Doppler response and the $fB$ Doppler response is $$\varphi = \frac{4\pi(fA - f\beta)R}{c} \text{ (radians)}$$

The constant c is the free space speed of light. This phase angle $\phi$ increases linearly with the target range R. A phase difference of ninety degrees at the maximum range of 400 feet defines the frequency difference to be 634 kHz for the preferred embodiment of the invention. This ensures that the phase difference $\Phi$ increases from zero to ninety degrees as the target goes from the antenna to the maximum range.

The AC coupled amplifier 31 has a logarithmic response which compresses the amplitude of responses from targets near to the transceiver relative to those at the further ranges. This tends to "level" the huge dynamic range of the normal 1/R4 radar response. The output of this amplifier is sampled and directed to a circuit to reconstruct the $fA$ Doppler response or to a second circuit to reconstruct the $fB$ Doppler response by control switches 32A and 32B. The timing and control circuit 40 operates these switches using control lines 43A and 43B. After a fixed time delay set by the range cutoff, control switch 32A or 32B is turned on for a brief sample window to direct a sample of the Doppler response into the appropriate circuit. Capacitors 33A and 33B are used to reconstruct the $fA$ and $fB$ Doppler responses respectively.

The output of amplifiers 34A and 34B are sampled by Analog to Digital Converters 35A and 35B. The timing and control circuit 40 controls the timing of this sampling process using control lines 44A and 44B. Following the transmission of a pulse at frequency $fA$, sample xA is updated and subsequently following the transmission of the pulse at frequency $fB$, sample xB is updated. Hence the Doppler response is sampled at half the pulse repetition rate which is 16 kHz in the preferred embodiment radar. These data are then processed in microprocessor 50. When a target is detected the microprocessor directs the timing and control circuit 40 to turn on the alarm relay 90.

Figure 2:
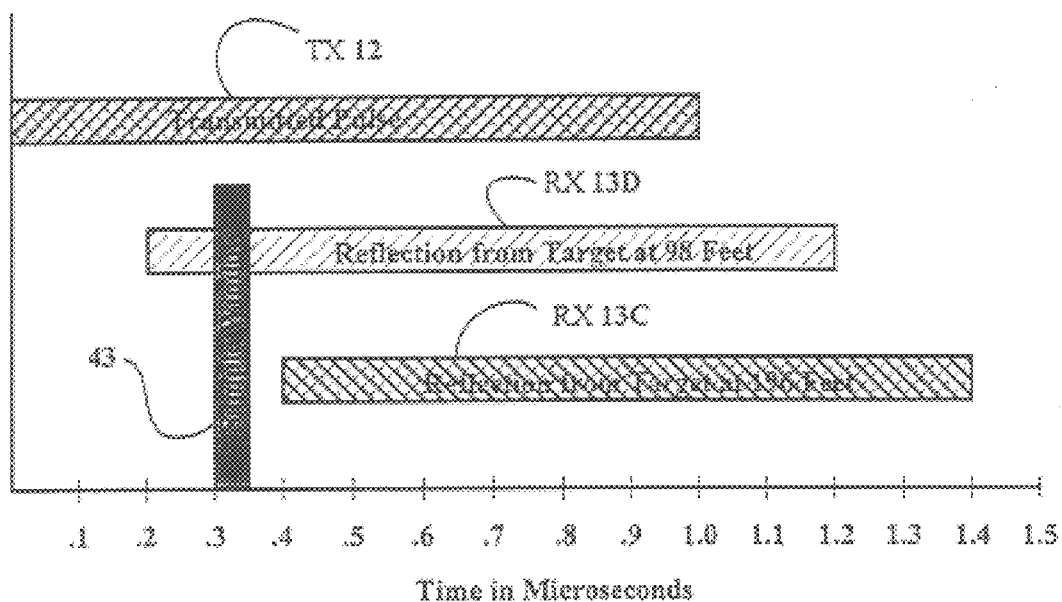
FIG. 2 illustrates the operation of the range cutoff circuit.

The operation of the range cutoff process is illustrated in FIG. 2. Target reflections 13D corresponding to a target at 98 feet and 13C corresponding to a target at 198 feet are shown in time relation to the transmitted pulse 12. For the purpose of range cutoff it is immaterial whether the transmission is at frequency $fA$ or $fB$. The sample window 43 is 50 nanoseconds wide and occurs 300 nanoseconds after the onset of the transmit pulse 12. In this example, the Doppler response from the target at 98 feet appears in sample window 43 and the Doppler response from the target at 198 feet is not seen in sample window 43. The installer adjusts a potentiometer to set the range cutoff. The maximum range setting corresponds to the 400-foot maximum range for which the difference Doppler phase provides unambiguous range information.

Figure 3:
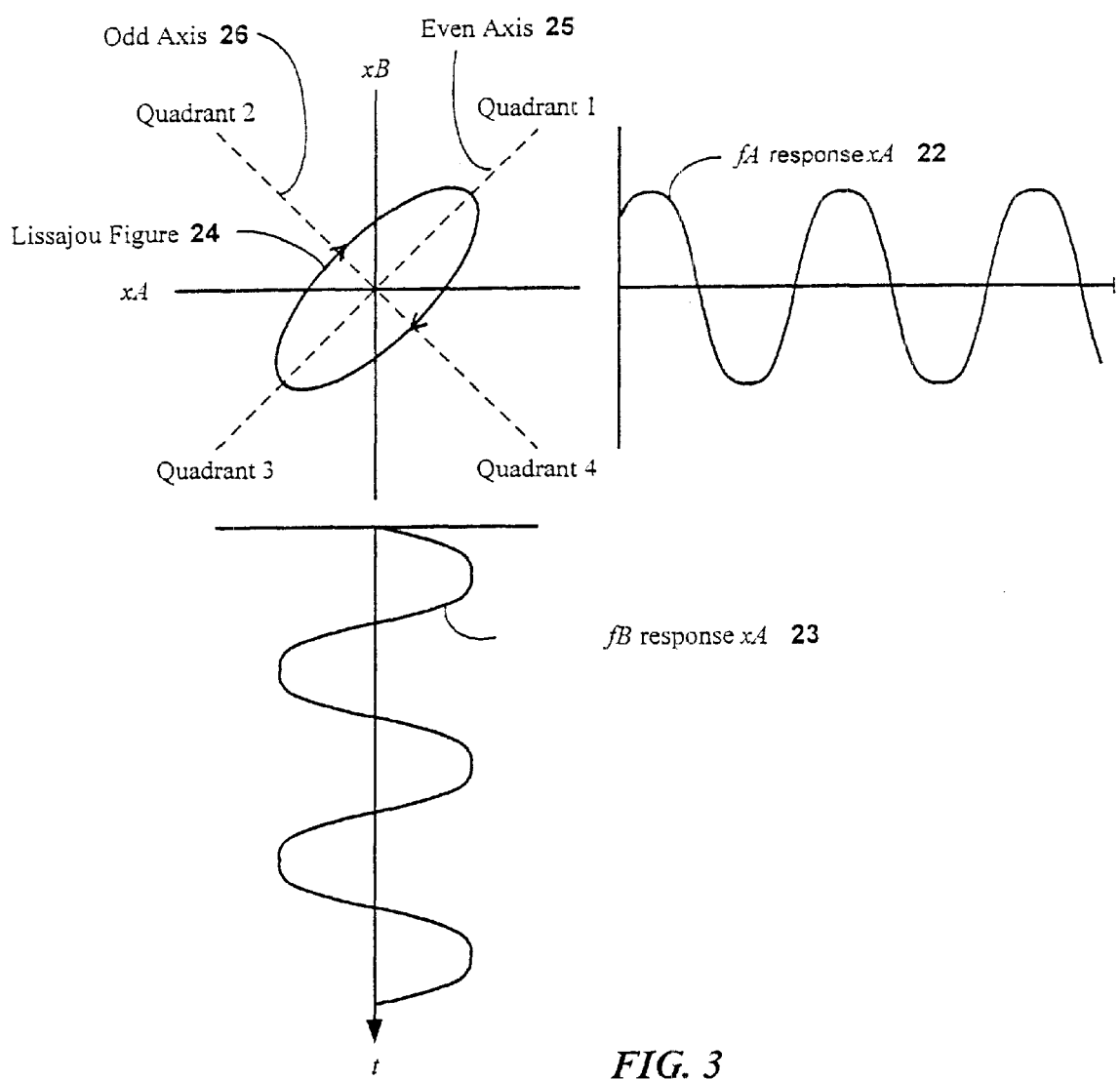
FIG. 3 shows a Lissajous figure used to explain the operation of the digital signal processing.

The signal processing is illustrated by means of the Lissajous figure shown in FIG. 3. The Doppler responses at frequency $fA$ 22 and $fB$ 23 are applied to the horizontal and vertical axis of the display. As the target moves away from the transceiver both exhibit a sinusoidal response. The amplitudes of the sinusoidal $fA$ 22 and $fB$ 23 Doppler responses are approximately equal. While the wavelengths at $fA$ and $fB$ are slightly different, for all intents and purposes both responses go through a cycle as the target moves ¼ of an inch operating at K Band. The relative phase of the Doppler response at $fA$ and $fB$ goes from zero to ninety degrees as the target moves from the transceiver to the maximum range of 400 feet. The phase difference between the two Doppler responses determines the dimensions of the elliptical Lissajous FIG. 24 along the "Even Axis" 25 and the "Odd Axis" 26.

For a target moving away from the transceiver, the $fA$ Doppler 22 leads the $fB$ Doppler 23 causing the Lissajous FIG. 24 to be traced in a clockwise direction. For a target moving towards the transceiver, the $fA$ lags the $fB$ Doppler causing the Lissajous figure to be traced in a counterclockwise direction. The velocity with which the target moves away or towards the transceiver determines the frequency of the two Doppler responses and hence the number of revolutions per second around the Lissajous figure.

While the Lissajous FIG. 24 is shown as a continuous curve, it in fact is a sequence of dots defined by the sample pairs of the digitized $fA$ and $fB$ responses. The $fA$ and $fB$ Doppler responses are collected sequentially, but the time delay between samples is sufficiently small that we can consider them as being taken at the same time. In the preferred embodiment of the present invention the difference frequency ($fA-fB$) is 634 kHz to provide a maximum range of 400 feet. RF pulses with duration of 1 microsecond are transmitted alternately at a 32 kHz rate. The Doppler response associated with each frequency is accumulated in analog sample circuits and digitized at an 8 kHz rate using an 8-bit Analog to Digital Converter. These data are then decimated to derive High Speed and Low Speed channel responses. The High Speed channel response is updated at a 4 kHz rate and the Low Speed channel response at a 1 kHz rate. Standard recursive IIR digital filters are used to remove all residual DC terms from the Doppler responses. Most of the DC component on the Doppler responses are removed in the analog circuitry by capacitive coupling.

The High Speed channel is designed to detect intruders that run through the detection zone. This means that the Doppler response is relatively large but of short duration. The Low Speed channel is designed to detect intruders that attempt to crawl through the detection zone as close to the ground as possible thereby creating a relatively small response but of long duration. The Low Speed channel includes more integration because of the longer duration of the targets and hence achieves a signal to noise ratio increase that minimizes the incidence of false alarms while detecting the smaller target.

The present invention differs from the prior art in how it uses the phase relationship between the two Doppler responses to determine target location, direction of travel and velocity of travel and uses this information to set range specific detection criteria. This includes range dependent amplitude thresholds and range dependent thresholds on net motion of the intruder. The key to this operation is to measure the properties of the Lissajou figure according to the process described in the flow chart shown in FIG. 4.

The input parameters, xAi, and xBi, are the Doppler response at frequencies $fA$ and $fB$ respectively at the ith instant of time. The routine is processed for 1024 samples to generate accumulated "Even" and "Odd" amplitudes ZE and ZO, range statistic R and net motion statistic S. The routine is performed for the High Speed Channel at a 4 kHz input rate and for the Low Speed channel at a 1 kHz rate. This means that the outputs of the routine for the High and Low Speed channels are generated at approximately 4 Hz and 1 Hz.

Figure 4:
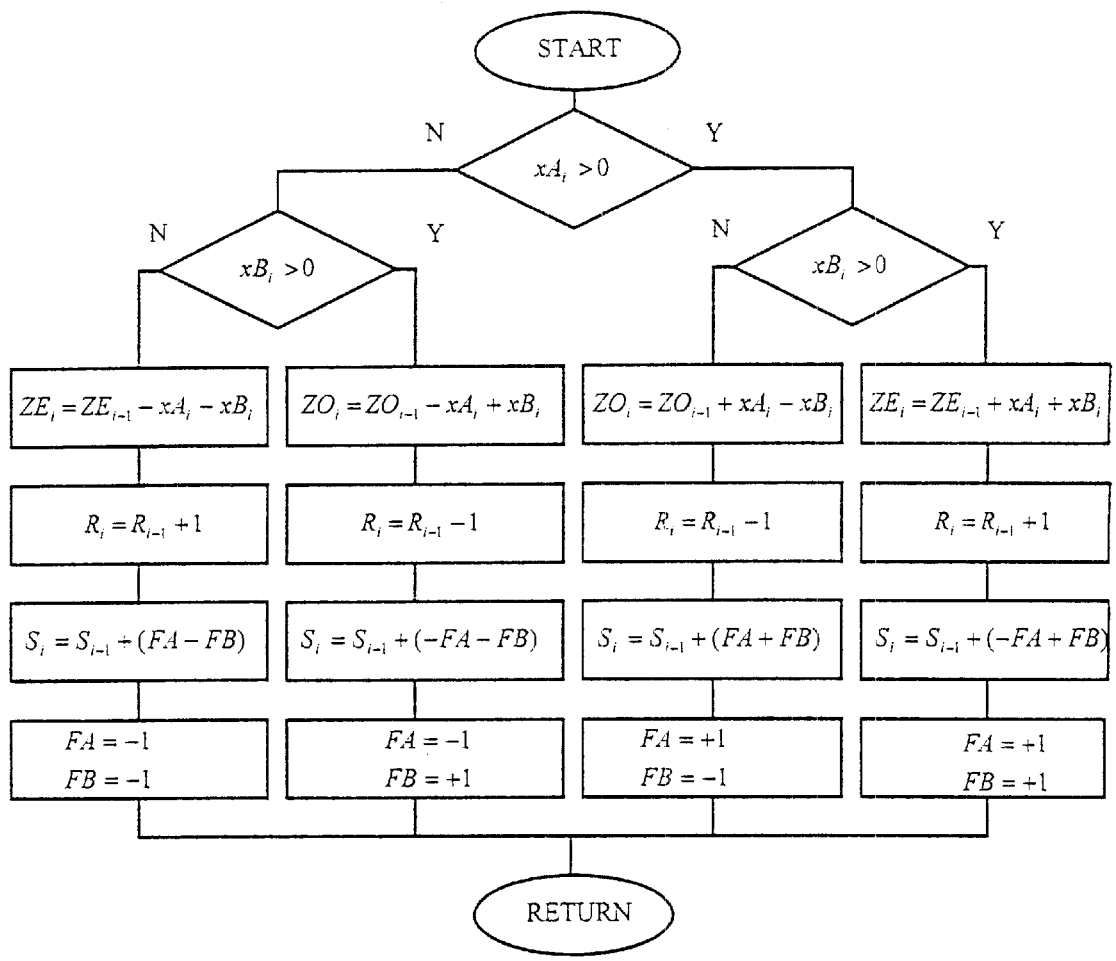
FIG. 4 is the flow chart of the algorithm used to compute the ZE and ZO responses as well as the velocity and direction of travel of the target.

In processing the Even and Odd routine described in FIG. 4, it is important that all DC components be removed from the Doppler responses by the highpass filters. The performance of the routine depends upon the changes in sign of the two Doppler responses as the intruder moves through the detection zone. The sign of xAi and xBi determines the quadrant of the Lissajous figure shown in FIG. 3. When xAi and xBi are both positive the response is in the first quadrant. When xAi and xBi are both negative the response is in the third quadrant. We refer to quadrants 1 and 3 as the "Even" quadrants because xAi and xBi have the same sign. When xAi is negative and xBi is positive the response is in the second quadrant. When xAi is positive and xBi is negative the response is in the fourth quadrant. Quadrants 2 and 4 are referred to as the "Odd" quadrants because xAi and xBi have the opposite sign.

The first step in the Even and Odd routine is to compute the amplitude of the Even and Odd responses, ZE and ZO. When the response is in Even quadrants 1 or 3, the amplitudes of xAi and xBi are added together and the result is accumulated for the 1024 samples in the variable ZEi. Note that the signs of xAi and xBi are inverted when the response is in the third quadrant. Similarly when the response is in Odd quadrants 2 or 4, the amplitudes of xAi and xBi are accumulated for the 1024 samples in the variable ZOi. Note that the sign of the negative term is inverted during this accumulation. At the end of the 1024 samples the accumulated ZE and ZO terms are a measure of the dimensions of the Lissajous figure along the Even and Odd axis as shown in FIG. 3. In a noise free system ZO is zero for targets at the transceiver and ZE is zero for targets at the maximum range. The ratio of ZE to ZO is one measure of the target range. This measurement depends upon the amplitude of the target.

The second step in the Even and Odd routine is to compute the statistical range to the target, R. In this case, the value of R is the accumulated sum of the number of samples in the Even quadrants minus the number of samples in the Odd quadrants. Hence in a noise free system R is equal to +1024 for targets at the transceiver and −1024 for targets at the furthest range. The value of R can then be used as a measure of target range. It differs from the ratio of ZO to ZE in that it does not depend upon the amplitude of the target but simply on the statistical distribution of the 1024 samples in the four quadrants. When noise is introduced into the system the maximum value of R reduces and the minimum value of R increases but there is still a linear response with range.

The third step in the Even and Odd routine is to compute the net motion of the target during the 1024 sample period. This requires the setting of two flags, FA and FB, each time through the routine to "remember" the last quadrant. The net motion number, S, is the accumulated sum of the flags as shown in FIG. 4. The net motion counter Si is increased by 2 each time the sample point moves from one quadrant to the next in a clockwise direction. The net motion counter number Si is decreased by 2 each time the sample point moves from one quadrant to the next in a counterclockwise direction. If the sample point should jump directly from an Even quadrant to an Even quadrant or from an Odd quadrant directly to an Odd quadrant the net motion counter is not changed. At the completion of the 1024 sample period the net motion counter, S, is the net number of cycles around the Lissajous times 8. The sign of S is positive for motion towards the transceiver and negative for motion away from the Transceiver.

The net motion count, S, can be used as a measure of the velocity of the target away from, or towards, the Transceiver. If the target velocity is too fast relative to the sample rate the sample points skip over quadrants which introduces an error into S. In the present design the 4 kHz sample rate of the High Speed channel is adequate to measure velocities of up to 20.8 feet per second which is the speed of a 4 minute mile runner. If a sprinter were to run towards, or away from, the Transceiver the magnitude of S could become inaccurate but the sign of S remains accurate for velocities of up to 41.6 feet per second which is not humanly possible.

The primary use of the net motion count, S, is to eliminate vibratory targets. A vibratory target such as blowing grass or shrubbery has no net motion while it is extremely difficult for an intruder to cross through the detection zone without generating some net motion. Setting a threshold on the net motion counter as one of the conditions for a target to be declared provides a means of eliminating alarms from vibratory targets.

The sum of the Odd (ZO) and Even (ZE) Doppler responses is the RMS amplitude of the Doppler response voltage. If amplifier 31 was linear as opposed to logarithmic, the amplitude of the total Doppler response voltage (ZE+ZO) would decay as the square of the range which is equivalent to a power decay of $1/R^4$. This decay rate means that the use of a single threshold for the entire range can cause one to detect a raindrop on the radome and miss an intruder at the furthest range. The computation of the Even and Odd amplitudes, ZE and ZO, provides a means of compensating for range. In such a linear system the ZE term would decay as $R^{-3}$ and ZO would decay as $R^{-1}$. The use of ZO for amplitude would provide linear amplitude compensation for range.

In the preferred embodiment of the present invention amplifier 31 is logarithmic. This significantly reduces the dynamic range of the Doppler output for targets near the transceiver to those at maximum range. It has been found that by setting Z=ZO+ZE/4 that Z provides an almost linear amplitude response with range from about 10 feet to 400 feet.

Contact Noise (or 1/f noise) is created in the microwave receiver circuit. It tends to appear largely in the ZE term. Hence there is a signal to noise advantage in using Z=ZO+ZE/4.

In the present invention the range information is used to create 8 range bins. The bins get progressively longer with range. This is done because the width of the detection zone gets wider with range and this preserves a constant aspect ratio (length to width) for each range bin. This means that it takes longer for an intruder to pass through the further range bins. As a result a significant improvement in signal to noise ratio can be achieved by applying progressively more integration of the Doppler response in the further range bins. In addition separate amplitude and net motion thresholds can be set for each range bin to further optimize the sensor performance.

It has been found that the ratio of ZE to ZO provides the most accurate estimate of location for intruders out to about 40 feet and that the statistical range R provides the most accurate estimate of location from 40 feet to 400 feet. This is because of the nature of the noise in the particular embodiment of the invention.

The range bin boundaries along with the statistical range boundaries and ratios of ZE to ZO are shown in the table below for the preferred embodiment system.

| Range Bin | Boundary Feet | High Speed R | Low Speed R | High Speed ZE/ZO | Low Speed ZE/ZO |
|---|---|---|---|---|---|
|  | 0 |  |  |  |  |
| 1 | 10 |  |  | 100 | 150 |
| 2 | 20 |  |  | 30 | 90 |
| 3 | 40 | 453 | 850 |  |  |
| 4 | 80 | 342 | 692 |  |  |
| 5 | 140 | 177 | 455 |  |  |
| 6 | 215 | 8 | 159 |  |  |
| 7 | 300 | −165 | −176 |  |  |
| 8 | 400 |  |  |  |  |

There are different values in this table for the High and Low Speed channels because of the different level of noise in the two channels. The Low Speed channel data is more heavily filtered.

In many radar systems one detects a target and then locates it. In this system a location is determined for each response so that optimal integration can be performed prior to the detection process. To determine if the response in range bin "m" exceeds the amplitude threshold for range bin "m" the following comparison is made.

$$(Z_j + Z_{j-1} + \ldots + Z_{j-m})/(m+1) > TAm$$

The subscript "j" in this equation denotes the amplitude accumulated over the "jth" set of 1024 samples. The amplitude threshold for range bin "m" is TAm. For range bin m=1 the average of the last two groups of 1024 samples is compared to the threshold for range bin 1. Because the detection zone gets wider as the range bin number increases it will take the intruder longer to cross and the sensor can afford to add up more samples.

In conventional microwave receivers the integration period is selected to match the highest speed target thereby providing less than optimal signal to noise improvement for targets at the furthest ranges. In addition, there is just one threshold for the full range of targets. The present invention provides optimal integration and range dependent thresholds to enhance the sensor performance.

When a target exceeds the amplitude threshold it is then tested against the net motion threshold. i.e.:

$$|S_j| > TMm$$

If the net motion during the last 1024 samples exceeds the net motion threshold TMm for the range bin "m" a target is declared.

This progressive integration with range dependent amplitude and net motion thresholds is repeated for both the High and Low Speed channels. The sensor declares the presence of an intruder if either the High or Low Speed channel detects a target.

Sensor performance is optimized through the selection of the amplitude and motion thresholds for each range bin and for both the High Speed and Low Speed channels.

For example, in most security applications the Low Speed amplitude threshold for range bin 1 is set quite high so to detect only very large targets such as a person walking in front of the radome. There is no attempt to detect crawling targets in range bin 1 as the field of the antenna pattern does not extend down to the ground. Multiple microwave units are used in an overlapping way so as to detect such crawling intruders. Similarly the High Speed amplitude threshold in range bin 1 is set high as persons jumping over the antenna pattern are detected by the same overlapping sensor technique. This virtually eliminates alarms from raindrops on the radome.

Multiple simultaneous targets will cause some confusion in the computation of the range to the target. In practice this will cause an alarm but the sensor may not recognize it as two targets but rather as one composite target. The fact that there is an alarm meets most security applications. To some extent this is academic because it is almost impossible for the two targets to appear simultaneously at two locations due to the varying width of the detection zone and the different response characteristics of the two intruders at two locations.

In addition to Alarm Relay output 90 the product can include a digital data communications port and the sensor can inform a central display system of the type of the alarm and the range bin of the alarm.

As described, the algorithm provides discrimination against periodic targets like wind blowing branches or grass. The net motion measure, S, changes sign with the axial direction of travel of the target. This means that the summation process averages out all but the net motion of the target over the period of the summation. With a wavelength of approximately one-quarter inch, an intruder will always provide a number of Doppler cycles while crossing through the detection zone with some net axial motion. This is particularly true of a crawling target for which the summation periods of Low Speed Channel is selected to optimize the discrimination against blowing vegetation.

In most applications microwave sensors are only used over flat terrain in areas void of vegetation. In these cases one common net motion threshold may be used. In other cases where there is a shrub or blowing grass in a particular range bin, the net motion thresholds can be set to minimize the number of nuisance alarms that would otherwise be caused by motion of such objects.

When the installer sets the range cutoff there is no adjustment of the sampling process or the location of the range bins. If the range cutoff is set to exclude one or more of the range bins, the thresholds for these unused bins are set to the maximum so as to avoid any false alarms that could be generated by the random noise of the receiver.

While the invention has been described with reference to a particular embodiment thereof, those in the art will be able to make various modifications to the described apparatus and method without departing from the true spirit and scope of the invention.

It should be apparent to one skilled in the art that while the invention has been described largely in terms of an algorithm that is performed in a microprocessor it could be performed in dedicated electronic circuitry or other combinations of hardware and firmware. These are details that pertain to the specific circuit design and do not affect the general operation of the invention.

What is claimed is:

1. A method of detecting the location and direction of movement of an intruder in a detection zone, said method comprising the following steps:
   a) alternately transmitting first and second frequency signals to the terminus of the detection zone;
   b) detecting Doppler response signals from an intruder in the detection zone to provide first and second response signals;
   c) sampling the first and second responses during a sampling period and generating corresponding first and second digital signal pairings;

d) classifying said digital signal pairing according to the phase of the respective Doppler response signals into even phase ZE and odd phase ZO signals;

e) determining the range to the intruder from an accumulation of ZE and ZO signals.

f) determining the sum of the ZE and ZO signals to provide a response amplitude signal, and g) comparing said response amplitude signal to a range dependent threshold.

2. The method in accordance with claim 1 wherein the step of determining the range to the intruder includes the step of determining the ratio of ZE to ZO signals, said ratio indicating the location of the intruder in the detection zone.

3. The method in accordance with claim 2 wherein the step of determining the range to the intruder further includes the step of determining the difference between the number of ZE signals and the ZO signal, said difference providing a linear response indicating range to the intruder.

4. The method in accordance with claim 3 further comprising the step of sampling the first and second signals at a high rate and a low rate, and generating corresponding first and second signal pairings.

5. The method in accordance with claim 4 further comprising the step of counting the number of transitions between even ZE signals and odd ZO signals, the number of transitions indicating the direction of movement of the intruder.

6. The method in accordance with claim 5 further comprising the step of establishing a threshold and comparing the number of transitions counted during sampling thereto.

7. The method in accordance with claim 6 further comprising the steps of subdividing the detection zone into range bins, storing the boundary limits of said range bins and assigning at least one range dependent threshold to each said bin for comparison with the accumulation of ZE and ZO signals.

8. The method in accordance with claim 7 further comprising the step of assigning to each said bin range dependent thresholds for high rate and low rate sampling of the first and second response signals.

9. The method in accordance with claim 8 further comprising the step of assigning a threshold to selected range bins for the ratio of ZE to ZO signals and assigning a threshold to non-selected range bins based on the difference between the number of ZE and ZO signals.

10. The method in accordance with claim 9 wherein the step of subdividing the detection zone into range bins includes establishing range bins of varying length, said bins increasing in length toward the terminus of the detection zone.

11. An intrusion detection system for determining the location and direction of movement of an intruder in a detection zone, said detection system utilizing the alternate transmission of RF signals at first and second frequencies in the detection zone and Doppler reflections thereof to locate the intruder, said system comprising:

a) a detector for receiving first and second Doppler response signals;

b) a sampling circuit for sampling said Doppler response signals;

c) a converter for providing first and second digital signal pairings from the samples;

d) a microprocessor coupled to the converter for classifying said digital signal pairings according to phase into even ZE and odd ZO signals and determining the net sum of the ZE and ZO signals, said net sum indicating the statistical range to the intruder.

12. The intrusion detection system of claim 11 wherein said microprocessor contains a plurality of range dependent thresholds stored therein, said microprocessor computing the amplitude ZO responses and comparing the amplitude with the stored thresholds thereby further locating the intruder.

13. The intrusion detection system of claim 12 wherein said microprocessor counts the net number of transitions between ZE signals and ZO signals, the net number of said transitions indicating the direction of movement of the intruder in the zone.

14. The intrusion detection system of claim 13 further comprising a timing and control circuit coupled to said sampling circuit for conducting the sampling at different rates.

15. The intrusion detection system of claim 14 further comprising a non-linear amplifier coupled to said detector for compressing the amplitude of Doppler responses from near targets.

* * * * *